United States Patent
Rossi et al.

(10) Patent No.: US 8,751,584 B2
(45) Date of Patent: Jun. 10, 2014

(54) SYSTEM FOR ASSIGNMENT OF A SERVICE IDENTIFIER AS A MECHANISM FOR ESTABLISHING A SEAMLESS PROFILE IN A CONTEXTUALLY AWARE PRESENCE ACCESS LAYER

(75) Inventors: Randy Michael Rossi, Toronto (CA); Jeff Rogers, Scarborough (CA); Suresh Chitturi, Plano, TX (US); Brian McColgan, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 1101 days.

(21) Appl. No.: 12/252,574

(22) Filed: Oct. 16, 2008

(65) Prior Publication Data
US 2010/0100617 A1   Apr. 22, 2010

(51) Int. Cl.
*G06F 15/16* (2006.01)
*G06F 15/173* (2006.01)

(52) U.S. Cl.
USPC .......................... 709/206; 709/233

(58) Field of Classification Search
USPC .................. 709/203, 204, 206, 223
See application file for complete search history.

(56) References Cited

U.S. PATENT DOCUMENTS

| | | | |
|---|---|---|---|
| 5,307,228 A | 4/1994 | Grasty | |
| 6,757,722 B2 | 6/2004 | Lonnfors et al. | |
| 6,928,294 B2 | 8/2005 | Maggenti et al. | |
| 6,965,767 B2 | 11/2005 | Maggenti et al. | |
| 7,043,538 B2 | 5/2006 | Guedalia et al. | |
| 7,187,935 B1 | 3/2007 | Day | |
| 7,206,934 B2 | 4/2007 | Pabla et al. | |
| 7,243,149 B2 | 7/2007 | Kelley et al. | |
| 7,246,371 B2 | 7/2007 | Diacakis et al. | |
| 7,302,270 B1 | 11/2007 | Day | |
| 7,337,465 B2 | 2/2008 | Kiyoto et al. | |
| 7,441,032 B2 | 10/2008 | Costa Requena | |
| 7,472,268 B2 | 12/2008 | Gray | |
| 7,551,925 B2 | 6/2009 | Simongini et al. | |
| 7,567,805 B2 | 7/2009 | Cox et al. | |
| 7,603,467 B2 * | 10/2009 | Malik et al. ................... | 709/227 |
| 7,676,548 B2 | 3/2010 | Oh et al. | |

(Continued)

FOREIGN PATENT DOCUMENTS

EP     1372314 A2    12/2003
EP     1396975 A2    3/2004

(Continued)

OTHER PUBLICATIONS

McColgan, Brian, et al.; U.S. Appl. No. 12/333,710, filed Dec. 12, 2008; Title: Method and System for a Context Aware Mechanism for Use in Presence and Location.

(Continued)

*Primary Examiner* — Larry Donaghue
(74) *Attorney, Agent, or Firm* — Conley Rose, P.C.; Maria L. Sekul; J. Robert Brown, Jr.

(57) ABSTRACT

A method for providing presence-related information is provided. The method includes creating a template of presence parameters for an application, storing the template, a presence access layer retrieving the template, the presence access layer using the template to create a profile of at least one presence parameter for the application, and the presence access layer using the profile to specify a presence-related action for the application.

20 Claims, 7 Drawing Sheets

(56) References Cited

U.S. PATENT DOCUMENTS

| | | | |
|---|---|---|---|
| 7,684,805 B2 | 3/2010 | Zhao et al. | |
| 7,697,950 B2 | 4/2010 | Jin et al. | |
| 7,702,753 B2 | 4/2010 | Simongini et al. | |
| 7,870,196 B2 | 1/2011 | Costa Requena | |
| 2001/0008404 A1 | 7/2001 | Naito et al. | |
| 2003/0028621 A1* | 2/2003 | Furlong et al. | 709/219 |
| 2004/0015569 A1* | 1/2004 | Lonnfors et al. | 709/220 |
| 2004/0032940 A1 | 2/2004 | Gray | |
| 2004/0123153 A1 | 6/2004 | Wright et al. | |
| 2004/0153506 A1 | 8/2004 | Ito et al. | |
| 2004/0158565 A1 | 8/2004 | Kakuta et al. | |
| 2004/0177134 A1 | 9/2004 | Lonnofors et al. | |
| 2004/0203432 A1 | 10/2004 | Patil et al. | |
| 2005/0068167 A1 | 3/2005 | Boyer et al. | |
| 2005/0135240 A1 | 6/2005 | Ozugur | |
| 2005/0198545 A1 | 9/2005 | Wieck et al. | |
| 2005/0221820 A1 | 10/2005 | Ruetschi | |
| 2005/0228895 A1* | 10/2005 | Karunamurthy et al. | 709/229 |
| 2005/0232184 A1 | 10/2005 | Borella | |
| 2005/0262198 A1 | 11/2005 | Leppanen et al. | |
| 2005/0266859 A1 | 12/2005 | Tejani et al. | |
| 2006/0085844 A1 | 4/2006 | Buer et al. | |
| 2006/0101266 A1 | 5/2006 | Klassen et al. | |
| 2006/0136717 A1 | 6/2006 | Buer et al. | |
| 2006/0143646 A1 | 6/2006 | Wu et al. | |
| 2006/0165058 A1 | 7/2006 | Caballero-McCann et al. | |
| 2006/0165092 A1 | 7/2006 | Wilson et al. | |
| 2006/0195591 A1 | 8/2006 | Kim et al. | |
| 2006/0234735 A1 | 10/2006 | Digate et al. | |
| 2006/0235994 A1 | 10/2006 | Wu | |
| 2006/0239186 A1 | 10/2006 | Wu | |
| 2006/0280166 A1 | 12/2006 | Morris | |
| 2006/0286993 A1 | 12/2006 | Xie et al. | |
| 2007/0010275 A1 | 1/2007 | Kiss | |
| 2007/0042791 A1* | 2/2007 | Walter | 455/461 |
| 2007/0123253 A1 | 5/2007 | Simongini et al. | |
| 2007/0150441 A1 | 6/2007 | Morris | |
| 2007/0150605 A1 | 6/2007 | Christoffersson et al. | |
| 2007/0168424 A1 | 7/2007 | Oh et al. | |
| 2007/0168449 A1 | 7/2007 | Malik et al. | |
| 2007/0182541 A1 | 8/2007 | Harris et al. | |
| 2007/0266076 A1 | 11/2007 | Cox et al. | |
| 2007/0288621 A1 | 12/2007 | Gundu et al. | |
| 2007/0291761 A1 | 12/2007 | Kauniskangas et al. | |
| 2008/0010301 A1 | 1/2008 | Tian et al. | |
| 2008/0028211 A1 | 1/2008 | Tanizawa et al. | |
| 2008/0108332 A1 | 5/2008 | Tian et al. | |
| 2008/0126541 A1 | 5/2008 | Rosenberg et al. | |
| 2008/0133742 A1 | 6/2008 | Southiere et al. | |
| 2008/0153538 A1 | 6/2008 | O'Shaughnessy et al. | |
| 2008/0183866 A1 | 7/2008 | Maeda et al. | |
| 2008/0205625 A1 | 8/2008 | Mandalia et al. | |
| 2008/0208953 A1 | 8/2008 | Tian | |
| 2008/0214170 A1 | 9/2008 | Laflamme et al. | |
| 2008/0285542 A1 | 11/2008 | Jachner | |
| 2008/0288649 A1 | 11/2008 | Burckart et al. | |
| 2008/0313321 A1 | 12/2008 | Kiss et al. | |
| 2009/0106677 A1 | 4/2009 | Son et al. | |
| 2009/0319655 A1 | 12/2009 | Viamonte Sole | |
| 2010/0075673 A1 | 3/2010 | Colbert et al. | |
| 2010/0077038 A1 | 3/2010 | Boberg et al. | |
| 2010/0088388 A1 | 4/2010 | Donovan | |

FOREIGN PATENT DOCUMENTS

| | | | |
|---|---|---|---|
| EP | 1396987 A2 | 3/2004 | |
| EP | 1511267 A1 | 3/2005 | |
| EP | 1545146 A2 | 6/2005 | |
| EP | 1775907 A2 | 4/2007 | |
| EP | 1793561 A1 | 6/2007 | |
| EP | 1396975 A3 | 1/2009 | |
| WO | 2005096592 A1 | 10/2005 | |
| WO | 2007007170 A2 | 1/2007 | |
| WO | 2008016263 | 2/2008 | |

OTHER PUBLICATIONS

McColgan, Brian, et al.; U.S. Appl. No. 12/333,756, filed Dec. 12, 2008; Title: Method and System for a Context Aware Mechanism in an Integrated or Distributed Configuration.
McColgan, Brian, et al.; U.S. Appl. No. 12/333,784, filed Dec. 12, 2008; Title: Method and System for Specifying, Applying and Extending Application Related Aspects Through Policies, Rules and/or Triggers.
Cisco Systems, Inc.; Cisco BTS 10200 Softswitch Release 4.1, 4.2, 4.4, 4.5, and 4.5.1 Provisioning Guide; Chapter 8; Nov. 17, 2008; 48 pgs.
So, Sin-Hang, et al.; U.S. Appl. No. 12/253,102, filed Oct. 16, 2008; Title: Controlling and/or Limiting Publication Through the Presence Access Layer.
Rogers, Jeff, et al.; U.S. Appl. No. 12/252,207, filed Oct. 15, 2008; Title: Interworking Function with a Presence Access Layer to Provide Enhanced Presence Aspect Indications.
Lee, Dalsu, et al.; U.S. Appl. No. 12/252,211, filed Oct. 15, 2008; Title: Incorporating Non-Presence Information in the Calculation of Presence Aspects by a Presence Access Layer.
Rogers, Jeff, et al.; U.S. Appl. No. 12/252,221, filed Oct. 15, 2008; Title: Use of Persistent Sessions by a Presence Access Layer.
McColgan, Brian et al.; U.S. Appl. No. 12/251,231, filed Oct. 4, 2008; Title: Method for Managing Opaque Presence Indications within a Presence Access Layer.
Open Mobile Alliance, Ltd.; PAL Explained; OMA-PAG-2008-0608R01-INP__PAL__V1_0__Overview; Sep. 16, 2008; 16 pgs.
Open Mobile Alliance, Ltd.; Presence SIMPLE Specification; Draft Version 2.0—Jul. 2, 2008; OMA-TS-Presence_SIMPLE-V2_0-20080702-D; 90 pgs.
Open Mobile Alliance, Ltd; Presence Access Layer WID; OMA-TP-2008-0105R03- INP__PAL__WI_for__presentation; Jun. 25, 2008; 22 pgs.
3GPP TS 23.141 V8.0.0; 3rd Generation Partnership Project; Technical Specification Group Services and System Aspects; Presence Service; Architecture and functional description; Release 8; Mar. 2008; 36 pgs.
Olson, S., et al.; SIMPLE Presence Publication Mechanism (draft-olson-simple-publish-01); Oct. 24, 2002; 27 pgs.
Bells, Matther, et al.; U.S. Appl. No. 12/621,256, filed Nov. 18, 2009; Title: Apparatus, and an Associated Method, for Providing and Using Opaque Presence Indications in a Presence Service.
Khartabil, H., et al., "Functional Description of Event Notification Filtering," Network Working Group, RFC 4660, Sep. 2006, 35 pgs.
PCT Communication Relating to the Results of the Partial International Search; PCT Application No. PCT/US2009/033808; Dec. 7, 2009; 6 pgs.
PCT International Search Report; PCT Application No. PCT/US2009/033808; Mar. 12, 2010; 7 pgs.
PCT Written Opinion of the International Searching Authority; PCT Application No. PCT/US2009/033808; Mar. 12, 2010; 6 pgs.
PCT International Search Report; PCT Application No. PCT/US2009/033809; Dec. 1, 2009; 4 pgs.
PCT Written Opinion of the International Searching Authority; PCT Application No. PCT/US2009/033809; Dec. 1, 2009; 5 pgs.
PCT International Search Report; PCT Application No. PCT/CA2009/001647; Feb. 23, 2010; 3 pgs.
PCT Written Opinion of the International Searching Authority; PCT Application No. PCT/CA2009/001647; Feb. 23, 2010; 5 pgs.
PCT International Search Report; PCT Application No. PCT/US2009/033806; May 14, 2009; 4 pgs.
PCT Written Opinion of the International Searching Authority; PCT Application No. PCT/US2009/033806; May 14, 2009; 6 pgs.
PCT International Search Report; PCT Application No. PCT/CA2009/000356; Jul. 16, 2009; 4 pgs.
PCT Written Opinion of the International Searching Authority; PCT Application No. PCT/CA2009/000356; Jul. 16, 2009; 3 pgs.
Brok, Jacco, et al.; Title: Enabling New Services by Exploiting Presence and Context Information in IMS; Bell Labs Technical Journal 10(4) ; 2006; pp. 83-100.

(56) References Cited

OTHER PUBLICATIONS

Chatterjee, Samir, et al.; Title: Instant Messaging and Presence Technologies for College Campuses; IEEE Network; May/Jun. 2005; pp. 4-13.
PCT International Search Report; PCT Application No. PCT/CA2009/000251; Jul. 6, 2009; 5 pgs.
PCT Written Opinion of the International Searching Authority; PCT Application No. PCT/CA2009/000251; Jul. 6, 2009; 6 pgs.
Rosenberg, J., et al.; Title: Session Initiation Protocol (SIP) Extensions for Presence; Internet Engineering Task Force; Internet Draft: draft-ietf-simple-presence-07.txt; May 20, 2002; 27 pgs.
PCT International Search Report; PCT Application No. PCT/CA2009/000355; Jul. 7, 2009; 3 pgs.
PCT Written Opinion of the International Searching Authority; PCT Application No. PCT/CA2009/000355; Jul. 7, 2009; 4 pgs.
European Extended Search Report; Application No. 09282032.0; Feb. 13, 2013; 6 pages.
Final Office Action dated Jan. 11, 2013; U.S. Appl. No. 12/251,231, filed Oct. 14, 2008; 21 pages.
Notice of Allowance dated Apr. 8, 2013; U.S. Appl. No. 12/251,231, filed Oct. 14, 2008; 15 pages.
Office Action dated Feb. 13, 2012; U.S. Appl. No. 12/251,231, filed Oct. 14, 2008; 35 pages.
Day, M., et al.; "A Model for Presence and Instant Messaging"; RFC 2778; Feb. 2000; 16 pages.
Office Action dated May 7, 2012; U.S. Appl. No. 13/355,269, filed Jan. 20, 2012; 28 pages.
Rogers, Jeff, et al.; U.S. Appl. No. 13/355,269, filed Jan. 20, 2012; Title: Use of Persistent Sessions by a Presence Access Layer.
Office Action dated Dec. 22, 2011, 30 pages, U.S. Appl. No. 12/621,256, filed Nov. 18, 2009.
PCT Written Opinion of the International Preliminary Examining Authority; PCT Application No. PCT/CA2009/000355; Oct. 18, 2010; 5 pgs.
Office Action dated Dec. 6, 2010, 23 pages, U.S. Appl. No. 12/252,221, filed Oct. 15, 2008.
Office Action dated Mar. 22, 2011, 34 pages, U.S. Appl. No. 12/252,207, filed Oct. 15, 2008.
Office Action dated Mar. 23, 2011, 30 pages, U.S. Appl. No. 12/252,211, filed Oct. 15, 2008.
Final Office Action dated Apr. 14, 2011, 14 pages, U.S. Appl. No. 12/252,221, filed Oct. 15, 2008.
Notice of Allowance dated Sep. 22, 2011, 23 pages, U.S. Appl. No. 12/252,221, filed Oct. 15, 2008.
Final Office Action dated Sep. 9, 2011, 20 pages, U.S. Appl. No. 12/253,102, filed Oct. 16, 2008.
Canadian Office Action; Application No. 2,737,436; Jul. 2, 2013; 4 pages.
European Examination Report; Application No. 09789462; Sep. 11, 2013; 6 pages.
Office Action dated Aug. 3, 2012; U.S. Appl. No. 12/251,231, filed Oct. 14, 2008; 19 pages.
Notice of Allowance dated Oct. 3, 2012; U.S. Appl. No. 13/355,269, filed Jan. 20, 2012; 20 pages.
Notice of Allowance dated Oct. 4, 2012, 20 pages, U.S. Appl. No. 12/621,256, filed Nov. 18, 2009.
Roach, A. B.; et al.; "A Session Initiation Protocol (SIP) Event Notification Extension for Resource Lists;" Network Working Group; RFC 4662; Aug. 2006; 40 pgs.
PCT International Preliminary Report on Patentability; PCT Application No. PCT/CA2009/000251; Jan. 24, 2011; 15 pgs.
PCT International Preliminary Report on Patentability; PCT Application No. PCT/CA2009/000356; Jan. 20, 2011; 11 pgs.
Office Action dated Feb. 17, 2011, 25 pages, U.S. Appl. No. 12/253,102, filed Oct. 16, 2008.
PCT International Preliminary Report on Patentability; PCT Application No. PCT/CA2009/001647; Feb. 22, 2011; 10 pgs.
PCT International Preliminary Report on Patentability; PCT Application No. PCT/US2009/033806; Jan. 19, 2011; 11 pgs.
Singh, Vishal K., et al.; "A Survey of Security Issues and Solutions in Presence"; Columbia University Computer Science Technical Reports; Feb. 10, 2006; 18 pages.
Canadian Office Action; Application No. 2,740,043; Nov. 21, 2013; 2 pages.
European Extended Search Report; Application No. 09827077.0; Nov. 14, 2013; 7 pages.

\* cited by examiner

SYSTEM FOR ASSIGNMENT OF A SERVICE IDENTIFIER AS A MECHANISM FOR ESTABLISHING A SEAMLESS PROFILE IN A CONTEXTUALLY AWARE PRESENCE ACCESS LAYER

BACKGROUND

Some user agents (UAs), such as mobile telecommunications devices, can collect presence information associated with the users of the user agents. The presence information might include the user's location, the user's availability, the user's willingness to communicate, the user's willingness to use a particular service or communication method, the users state of mind, activities the user is currently engaged in, applications currently executing on the users UA, and similar data that relates to the current state of the user and/or the UA. An entity that has presence information associated with it, such as a human user of a UA, can be referred to as a presentity. A presentity might also be a non-human entity, such as an application executing on a UA. An entity that provides presence information on behalf of one or more presentities can be referred to as a presence source. For example, a UA that provides presence information associated with its user could be a presence source. When a presence source is associated with only one presentity, the presence source and the presentity could be considered equivalent.

A presence source that has collected presence information about a presentity might transmit the presence information to an entity that can be referred to as a presence server. The presence server might then provide the presence information to an entity that wishes to consume the presence information. This entity can be referred to as a watcher. As an example, if a presentity "Bob" has consented to allow other users to have access to information about his current location, Bob's UA might transmit his location information to a presence server. If a watcher "Alice" wished to learn Bob's current location, Alice's UA might submit an appropriate request to the presence server, and the presence server might send presence information about Bob to Alice's UA. Alice's UA might then process the presence information to determine Bob's location.

As used herein, the term "user agent" or "UA" might in some cases refer to a mobile device such as a mobile telephone, a personal digital assistant, a handheld or laptop computer, or a similar device that has telecommunications capabilities. In other cases, the term "UA" might refer to devices that have similar capabilities but that are not transportable, such as fixed line telephones, desktop computers, set-top boxes, or network nodes. The term "UA" can also refer to any hardware or software component that can terminate a communication session, such as a Session Initiation Protocol (SIP) session. Also, the terms "user agent", "UA", "user equipment", "UE", and "node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure discusses the use of profiles to facilitate the establishment of presence-related parameters and policies on behalf of a service or application. The profiles might be managed by a presence access layer, which, as described in more detail below, is an entity that can assume some of the functions that might otherwise be performed by the services or applications. The following discussion of presence information in general and the presence access layer in particular may aid in clarifying the subsequent discussion of the profiles.

Figure 1:
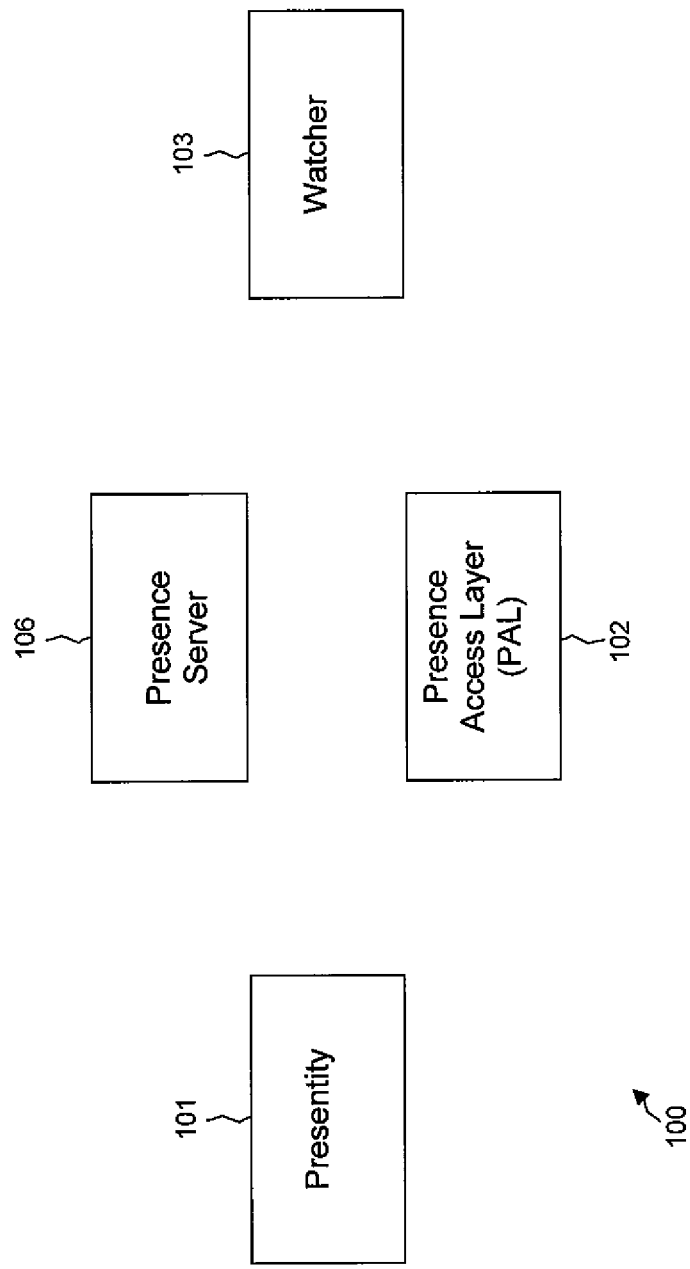
FIG. 1 is a block diagram of a communications system according to an embodiment of the disclosure.

FIG. 1 is a block diagram of an embodiment of a system 100 that includes one or more presentities 101, one or more watchers 103, a presence server 106, and a presence access layer (PAL) 102, as described below. The PAL 102 might reside wholly or partially in the presence server 106, in the presentity 101, in the watcher 103T in one or more services or applications, and/or in one or more other network components. The functionality provided by the PAL 102 may be divided between these and/or other components. Alternatively, the PAL 102 might be a standalone component.

As mentioned above, the presentity 101 might be a human or non-human entity with which presence information is associated. The presentity 101 might reside wholly or partially on a UA or wholly or partially in a network or on a network component. Although not shown, multiple presence sources that capture presence information on behalf of the presentity 101 might be present. Multiple presentities 101 might also be present, and a single presence source might be associated with multiple presentities 101 and/or a single presentity 101 might be associated with multiple presence sources. Hereinafter, the term "presentity" might refer only to one or more presentities 101 or might refer to one or more presentities 101 and one or more associated presence sources. That is, no distinction will be made between a presentity and a presence source, but it should be understood that in some cases these can be separate entities.

The watcher 103 might be one or more humans, applications, services, or other entities that monitor or wish to consume presence information associated with the presentity 101. When the watcher 103 is an application or a service, the application or service might be wholly or partially resident on a UA. Alternatively, the application or service might be wholly or partially resident on a network component. Hereinafter, the term "watcher" might refer to a human, an application, or a service interested in presence information, to a UA or network component on which such an application or service resides, or to any combination of these entities.

The presentity 101 might be able to define which watchers 103 can receive the presentity's presence information and which presence information the watchers 103 can receive. As an example, the presentity user "Bob" might specify that all of his work supervisors can receive all of his presence information. He might also specify that the watcher "Alice" can receive information about his current willingness to communicate but can receive none of his other presence information, such as his current location. Alternatively, another entity, such as Bob's employer, might designate which elements of Bob's presence information will be made available to which watchers 103.

A plurality of applications or services, such as instant messaging services or push-to-talk services, might be associated with the presentity 101, and these applications or services might be provided by one or more devices. The presentity 101 might publish presence information from a plurality of these devices. For example, Bob might be using a desktop computer and a handheld telephone simultaneously and may be considered available on either device. If Bob did not use the computer for an extended period of time, the computer might enter a sleep mode, and Bob might become unavailable on that device. However, he might remain available on the handset.

The presentity 101 can publish its presence information to the presence server 106. Only certain portions of the presence information might be made available to the watchers 103, and only certain watchers 103 might have access to the presence information. The presentity 101 or a third party (for example, a service provider or administrator) might publish rules or policies to the presence server 106 that define the portions of the presence information that will be made available to the watchers 103 and which of the portions will be made available to which of the watchers 103. The rules or polices might be established for groups of presentities 101 and/or groups of watchers 103. The rules or polices might be provided to the presence server 106 in a policy document. Alternatively, the presence information that will be made available to a particular watcher 103 might be determined at the time that watcher 103 requests presence information.

As used herein, the term "rule" refers to a sequence of logic that, when executed, can specify actions. The term "policy" refers to logic that can aid in the evaluation of a rule by, for example, providing hints, clarifying indeterminate or inconclusive scenarios during processing, or providing parameters. A distinction might also be made between a rule and a base rule and between a policy and a base policy. A base rule is typically a common interoperable rule or a default rule. That is, a base rule is a rule that is specified when no specific service or platform has overridden or changed it. Therefore, the term "rule" could refer to any rule, base or otherwise. A rule set is a collection of rules used in the evaluation of presence aspects. Similarly, the term "policy" could refer to the set of all policies, and the term "base policy" could refer to a common or default policy that is used when a policy has not been overridden, extended, or enhanced.

The presence server 106 is a network component that receives presence information from the presentity 101 and provides presence information to the watcher 103. The rules or policies that define the presence information that will be made available to the watchers 103 might be stored on and/or processed by the presence server 106. When the watcher 103 wishes to receive presence information associated with the presentity 101, the watcher 103 can send a request to the presence server 106. The presence server 106 can then determine if the watcher 103 is authorized to receive the presentity's presence information. If the watcher 103 is authorized, the presence server 106 sends the presence information to the watcher 103.

The presence information might be sent to the watcher 103 in a Presence Information Data Format (PIDF). Alternatively, more detailed information might be provided if the rich presence extension to PIDF (RPID) is used. In either case, the presence information might be provided in a presence document that can be encoded in extensible markup language (XML) or another appropriate format. The presence document is typically a large document that contains all of the presence information that the presentity 101 has allowed the watcher 103 to obtain. That is, even when the watcher 103 wants to learn only a single element of presence information, such as the presentity's current willingness to communicate, the presence document might contain numerous additional elements of presence information.

Upon receiving the presence document, the watcher 103 parses the XML or other encoding scheme to extract the desired presence information. The entire presence document is typically parsed, regardless of the amount of presence information that is sought. For example, if the watcher 103 wished to learn the presentity's current willingness to communicate, the watcher 103 might need to sift through large amounts of unrelated data, such as the presentity's location, the presentity's willingness to use a particular service, the applications currently executing on the presentity's UA, and other information, to find the single data element that is desired.

In some cases, the watcher 103 might wish to learn a combination of information about the presentity 101. For example, if the watcher 103 wanted to send an instant message to the presentity 101, the watcher 103 might first attempt to determine the presentity's willingness to communicate and whether an instant messaging application is currently executing on the presentity's UA. In such cases, the watcher 103 might again send a single request for presence information to the presence server 106 and might again receive the entire presence document. The watcher 103 would then parse the entire document to find the plurality of data elements that are desired and perform the appropriate logical operations to correlate the data elements and derive the combination of information that was desired.

It may be possible that the presentity 101 did not specify whether or not the watcher 103 could have access to a data element that the watcher 103 is trying to obtain. In that case, the presence document may not contain the information that the watcher 103 is seeking. In such a case, the results of the watchers parsing of the presence document may be indeterminate and it may not be clear what further actions the watcher 103 should take.

In some cases, the PAL 102 might be present to promote more efficient processing and dissemination of presence information. The PAL 102 can abstract and simplify complex presence information on behalf of the watcher 103. That is, the PAL 102 can act as a proxy for the watcher 103 by receiving a presence information request from the watcher 103, sending the request to the presence server 106, receiving a presence document from the presence server 106, parsing the information in the presence document, and returning to the watcher 103 a single value, such as "true" or "false", as a response to the presence information request.

The PAL 102 allows the watcher 103 to submit a request for a single element of presence information, which can be referred to as a presence aspect. For example, the presentity's willingness to communicate might be a presence aspect, the presentity's current location might be another, the presentity's preferred means of communication might be another, and so on. The presence aspects are reusable, interoperable abstractions that can be applicable across a plurality of applications or services. The watcher 103 can send a message to the PAL 102 specifying a single presence aspect for which the watcher 103 is seeking information. The PAL 102 can then respond with information related only to that presence aspect.

As an example, if the watcher 103 wishes to learn whether the presentity 101 is currently willing to communicate, the watcher 103 can submit a request to the PAL 102 for information specifically about that presence aspect. If the presentity 101 has specified that the watcher 103 can have access to the presentity's willingness information, the PAL 102 can respond with a single value indicating the presentity's willingness or unwillingness to communicate. The watcher 103 then needs to process only this single value. This can be contrasted with the situation where the PAL 102 is not present. In that case, the watcher 103 would ask for presence information in general, receive the entire presence document, and parse the presence document to determine the willingness aspect.

The PAL 102 can also process more complex requests from the watcher 103. For example, if the watcher 103 wished to determine a combination of information associated with the presentity 101, the watcher 103 might send the PAL 102 a request for each desired presence aspect. The PAL 102 might then return a response for each of the requests. Alternatively, the PAL 102 might correlate multiple presence aspects and return a single value to the watcher 103 that represents the combination of information that the watcher 103 was seeking.

In addition to greatly simplifying the manner in which the watcher 103 requests, receives, and processes presence information, use of the PAL 102 can allow processing that might previously have been performed by the watcher 103 to be offloaded to the PAL 102. In the cases where the PAL 102 is a standalone component or resides wholly or partially in the presence server 106 or some other network component, offloading the processing of presence information to the PAL 102 can free some of the processing capabilities of the watcher 103 for other purposes.

The PAL 102 may also process presence information on behalf of multiple applications or services that might otherwise redundantly perform the same presence information processing. That is, multiple applications or services might reside on or be available to the watcher 103, and each might have the capability to request, receive, and process presence information. Many of the steps that the applications or services take with regard to the presence information might be common to several of the applications or services. For example, there may be common presence-related rules or logic that would apply to both an instant messaging service and a push-to-talk service. If the PAL 102 is not present, each of these services might perform the common steps separately. If the PAL 102 is present, the PAL 102 can perform the common steps on behalf of each of these services and then return the results of the processing to the services. This can allow common procedures to occur only one time, thus increasing the efficiency of the watcher 103 and the applications or services it uses.

The PAL 102 can also ensure that indeterminate results are not returned to the watcher 103. As mentioned previously, if the watcher 103 seeks information about a presence aspect for which the presentity 101 has not provided information, the watcher's parsing of the presence document to determine that information might be inconclusive. The PAL 102, however, can contain functionality that specifies a definitive response to a presence information request even when information about the requested presence aspect is not available. For example, if the presentity 101 has not specified a willingness or an unwillingness to communicate, and if the watcher 103 submits a request for the presentity's willingness presence aspect, the PAL 102 might provide a default willingness value to the watcher 103. For instance, the PAL 102 might indicate that the presentity 101 is unwilling to communicate for an indefinite period of time. In this way, the watcher 103 can be assured of receiving a usable response to any presence information request.

While the above discussion has focused on the PAL 102 providing presence information to the watcher 103 in response to the watchers request for the current status of that information, the PAL 102 might also provide presence information based on a trigger defined by the watcher 103. That is, the watcher 103 might specify that it wishes to be informed when a change occurs in a presence aspect. When the PAL 102 detects that the specified change has occurred, the PAL 102 can notify the watcher 103 of the change. A trigger might apply to a presence aspect alone or to a presence aspect in combination with one or more applications or services. In addition, a trigger might be used to receive presence information from a plurality of presentities 101 and/or to provide presence information to a plurality of watchers 103.

As an example, the watcher 103 might have previously determined that the presentity's willingness presence aspect has a value that indicates that the presentity 101 is currently unwilling to communicate. The watcher 103 might wish to know if the presentity 101 becomes willing to communicate at a later point in time. The watcher 103 could establish a trigger on the PAL 102 requesting to be notified of a change in the presentity's willingness presence aspect. The PAL 102 would then monitor the presentity's willingness presence aspect and would inform the watcher 103 if that presence aspect changed from "unwilling" to "willing".

The use of the PAL 102 does not necessarily preclude the presence server 106 sending the presence document to the watcher 103. For example, if the watcher 103 wishes to obtain a large amount of presence information, there may be circumstances in which it is more efficient for the watcher 103 to parse the entire presence document received from the presence server 106 rather than processing multiple individual presence aspect values received from the PAL 102. The PAL 102 provides an upgrade option that might be used to hide complexity from the watcher 103 in some circumstances.

The above discussion was intended to provide sufficient information to promote an understanding of presence information in general and the presence access layer in particular. With this context in place, the discussion can now turn to the use of templates to facilitate setting presence-related parameters in a service or application.

Figure 2:
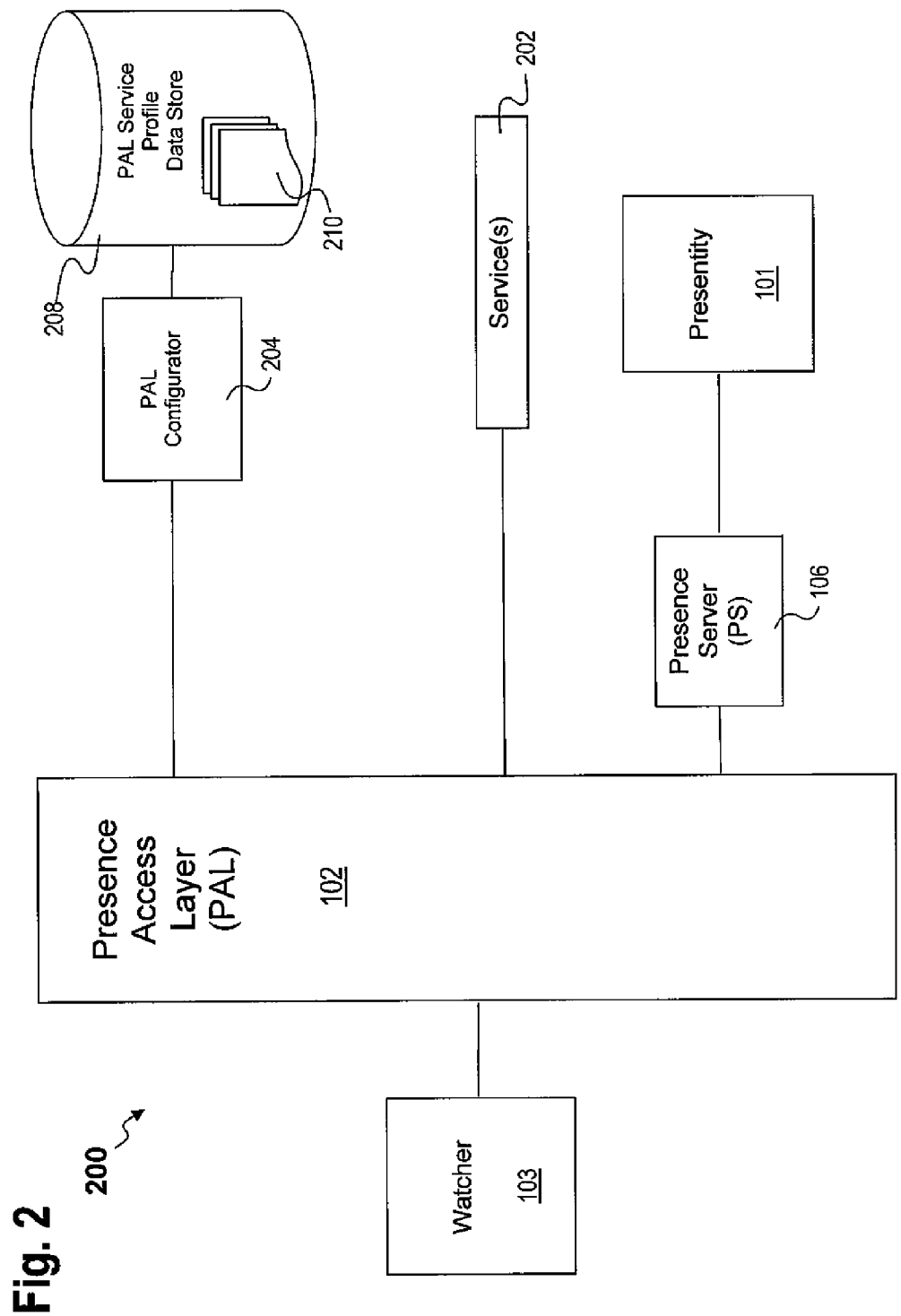
FIG. 2 is a block diagram of a communications system according to an alternate embodiment of the disclosure.

Referring now to FIG. 2, illustrated is an embodiment of a communications system 200 that might implement the PAL 102. FIG. 2 is exemplary and may have other components or arrangements in other embodiments. The system 200 includes the PAL 102, the presentity 101, the watcher 103, and the presence server (PS) 106 as previously discussed in FIG. 1, and one or more services 202.

It may be complicated or time-consuming to manage and configure the relevant presence-related information and parameters for new and existing services 202 or applications. According to an embodiment of the present disclosure, reusable profile templates 210 may be employed to assist in the management or establishment of presence-related parameters for the services 202 or applications. The profile templates 210 can include a list or a repository of various presence parameters, such as rules, rule sets, triggers, logic, and policies, with associations to respective services 202. Each of the profile templates 210 might be used to create a profile of the presence parameters typically applicable to one of the services 202. The presence parameters in a given instance of a profile template 210 are provided to the PAL 102 as a profile and are used by the PAL 102 on behalf of PAL-capable services and/or clients.

The profile templates 210 might be stored on a PAL service profile data store 208 and managed by a PAL configurator 204. The PAL configurator 204 is a system or application that automatically, or responsive to user input, provides management of the profile templates 210. For example, the PAL configurator 204 can be used to create the profile templates 210 and to retrieve a profile template 210 appropriate for one of the services 202.

The profile templates 210 are reusable and extensible and can include various presence parameters that may be deleted, overridden, or modified. The profile templates 210 may provide profiles to the PAL 102 that may be associated and applied to a service, a group of services, a presentity, a group of presentities, a watcher, or a group of watchers. In some instances, the profile templates 210 might have selectable fields for enabling or disabling desired presence parameters for one or more of the services 202. In this way, the amount of data that the PAL 102, the configurator 204, or an end user needs to provision in order to set up a desired set of presence parameters can be reduced.

The services 202 might be accessed by a UA (not shown) and may reside on the UA or may be located on a remote server (not shown). The services 202 may include a variety of services, such as Open Mobile Alliance (OMA) Push-to-Talk (PoC), an email application, Extensible Messaging and Presence Protocol (XMPP), Internet Chat Relay (ICR), network status elements or location based services, and other presence-capable services that might be employed on or accessible to a UA. The PAL 102 can provide presence aspect interfaces and/or trigger interfaces to watcher clients that use the services 202 and provide the clients with easier-to-consume presence information.

As an example, a large enterprise might include multiple groups of employees that have UAs. A network administrator within the enterprise may make use of the profile templates 210 to assign similar presence parameters to each instance of a service 202 manifested on the UAs. For instance, the watcher 103 might be a manager and the presentity 101 or presentities 101 might be a group of employees, and the manager might wish to keep track of the employees' locations via a location-based service 202 on the employees' UAs. The manager might interface with the PAL configurator 204 to retrieve a profile template 210 appropriate for the location-based service 202. The manager could then use the profile template 210 to create a specific instance of a profile, and the profile could be used to assign or change presence parameters relating to the location-based service 202.

In an embodiment, one or more of the profile templates 210 might be associated with a plurality of child profile templates. The parent profile templates 210 and the plurality of child profile templates might be useful in assisting the PAL configurator 204 in managing presence parameters of various services having multiple sub-services or for managing a class or collection of services. For example, an IP Multimedia Subsystem (IMS) service might provide location information via a Global Positioning System (GPS). The IMS service may be assigned a profile template with a respective child template that may be used to convey specific presence parameters for the GPS location service. In some instances, the PAL configurator 204 might desire to create a service identifier or sub-service identification which enables a group of multiple services to be associated with a common category of services and identified as a single template or within a parent template. The service identifier and sub-service identifier may include a number of other indicators assigned to each of the profile templates 210. Some of the profile templates 210 might include only the service identifier, while others might include the service identifier and one or more sub-service identifier. The plurality of child profile templates might each be assigned a sub-service identification and associated with one or more of the profile templates 210.

For example, a profile template may be assigned a service identifier '1' and a child template might be assigned a sub-service identifier '1a' that indicates an association of the respective profile template and child template. The profile template with the service identifier '1' might be associated with a web browser, an email service, and an instant messaging service, and other services. The child template '1a' might be associated with a specific user or a sub-service. Moreover, management of presence parameters for multiple users might be accomplished by the profile template '1' and multiple child templates '1a', '1b', '1c', . . . '1N' for each respective user or sub-service.

In some embodiments, the profile templates 210 might provide the PAL configurator 204 the ability, automatically or by user input, to fill in presence parameters for the services 202. Since the profile templates 210 might include a service identifier associated with a group of similar services, the associated group may be populated with presence parameters embedded within the profile template. Thus, when a new service is available that might be similar to the group of services, the presence parameters may be automatically provided by the profile template by merely associating a child template with one of the profile templates 210. This can reduce the amount of work needed to set up presence parameters for the services 202 and can push common settings up towards the parent profile as much as possible, thus minimizing the number of parameters that might need to be set in the child sub-services. Automatic fill-in might also include associating a profile template with a group of presentities or watchers. Consequently, registered users of an Internet domain might be assigned a pre-determined set of presence aspects, and as new users are added to the domain, presence parameters are automatically provided by the associated profile template.

In another embodiment, the profile templates 210 might be associated with certain access controls that might permit, for example, a service provider or the PAL configurator 204 to alter various rules or policies regarding presence aspects. In some instances, the service provider might allow the PAL configurator 204 to modify or change only certain presence parameters of the profile templates 210. The service provider might also authorize the PAL configurator 204 to access or modify certain presence parameters of profile templates 210. In other instances, the PAL configuration administrator 204 might permit the presentity 101 to change certain presence parameters selections in the profile templates 210.

Figure 3:
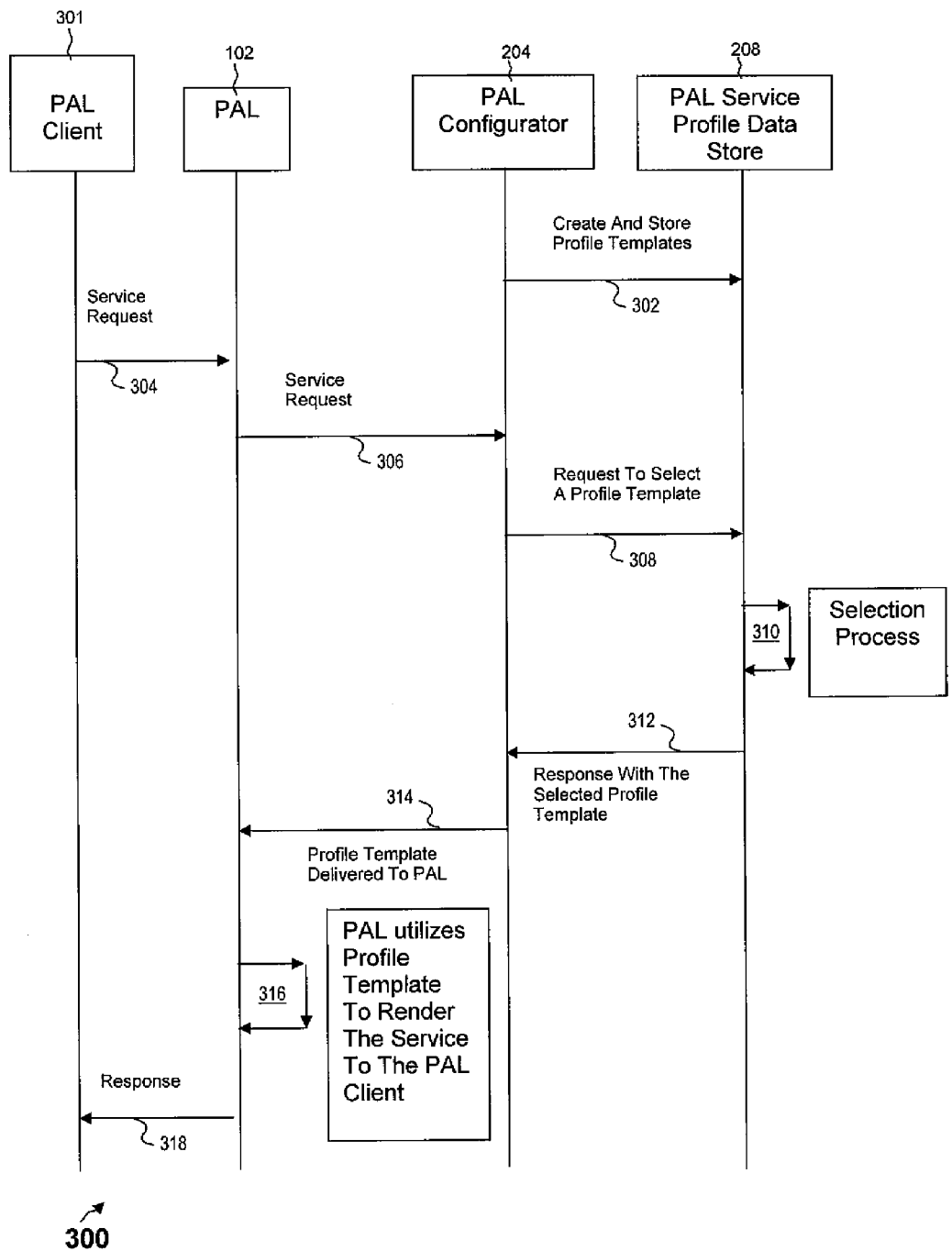
FIG. 3 is a flow chart of a method for communicating according to an embodiment of the disclosure.

FIG. 3 illustrates an example of a message flow for accessing the profile templates 210 to assign presence parameters. At event 302, the PAL configurator 204 creates the profile templates 210 and stores them in the PAL Service Profile data store 208. As the PAL configurator 204 creates the profile templates 210, service and sub-service identifications might be assigned to each one of the profile templates 210. For example, the PAL configurator 204 might create a profile template for a web browser and assign a service identifier of '2'. A location-based service operating within the web browser may be assigned a sub-service identifier of '2a' corresponding to a child template associated with the profile template of the web browser.

In an embodiment, either before or after the creation of the templates 210, a service request may be made by one or more services 202, which might be represented as a PAL client 301. For example, an administrator might prepare the templates 210 in advance and later choose one that is appropriate for a service request. Alternatively, if a template 210 appropriate for a service request does not yet exist, the administrator might create a new template 210 at the time the service request is made. In the example of FIG. 3, the templates 210 are created and stored prior to a service request.

At event 304, a service request (for example, a 'willingness' presence aspect request for a service 'InstantMessage') is sent from the PAL client 301 to the PAL 102. The PAL 102 determines that a profile is required and therefore, at event 306, relays a fetch profile request toward the PAL configurator 204. The fetch profile request for service might relate to activation of a UA, a loading of an application, an inter-application message, or other types of requests.

At event 308, the PAL configurator 204 sends the PAL Service Profile data store 208 a message requesting selection of one or more of the profile templates 210. The message might include one more indicators including the service identification (ID) and/or a sub-service identification that is associated with one or more of the profile templates 210. For example, the message might indicate the service identifier '2' and the sub-service identifier '2a' to select the templates for the web browser and the location-based service.

At event 310, one or more of the profile templates 210 are selected for the PAL client 301 based on a type of service and/or the requested service or sub-service identifications. A response message with the selected profile templates 210 is sent from the PAL Service Profile data store 208 to the PAL configurator 204 at event 312.

At event 314, the profile template is delivered to the PAL 102. At event 316, the PAL 102 utilizes the profile template to render service to the PAL client 301. For example, the PAL 102 might utilize the profile template to evaluate the presence aspect 'willingness' for an instant messaging service on behalf of the PAL client 301. The instance of the profile template might be modified or overridden by the PAL 102. A response message is sent at event 318 towards the PAL client 301. For example, the PAL 102 might provide the 'willingness' aspect result to the PAL client 301. The PAL 102 has therefore applied relevant rules, policies, and presence aspects to the services 202 for consumption by the PAL client 301 in accordance with the profile. FIG. 3 is exemplary and other flow charts and procedures could be used.

Figure 4:
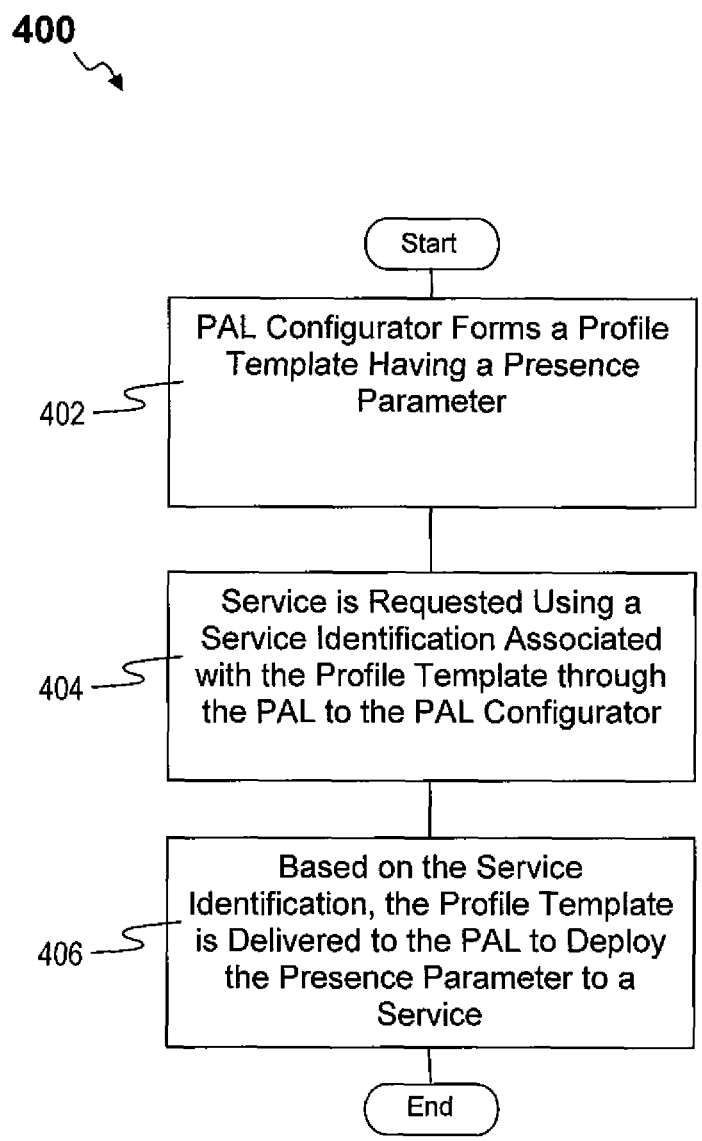
FIG. 4 is a flow chart of a method for communicating according to an embodiment of the disclosure.

FIG. 4 illustrates an embodiment of a method for providing presence-related information. At block 402, a profile template having at least one presence parameter is created by a PAL configurator. The PAL configurator assigns various presence parameters that may be later associated with one or more services into one or more profile templates. The PAL configurator might also assign a service identification or sub-service identification to one or more of the profile templates. The service identification or sub-service identification might include a number, an object, or other identifier.

At block 404, a service is requested using a service identification associated with the profile template. The request might be made through the PAL to the PAL configurator. That is, upon initiation, the service might ask the PAL configuration manager for a profile template via the service or sub-service identification.

At block 406, a profile is provided to the PAL 102 from the profile templates based upon the selected service or sub-service identification. The profile includes the presence parameters stored in the profile template and is used to deploy presence parameters to the service. In other words, upon sending the service identification to the PAL configurator, the PAL receives the profile set forth by the profile template that is associated with the selected service identification. In response, the PAL makes use of presence parameters embodied in the profile applicable to a service and/or other entity such as a presentity or a watcher. It is possible for the PAL to further change the profiles based on currently loaded rules or constraints within the PAL. That is, it is possible to make use of specific semantics to establish that a particular profile parameter is not needed or that it could cause a conflict with another parameter. FIG. 4 is exemplary and other flow charts and procedures could be used.

The present disclosure as described above might also in some embodiments include the profile templates 210 implemented as Open Mobile Alliance (OMA) Managed Objects (MOs) or other components.

Figure 5:
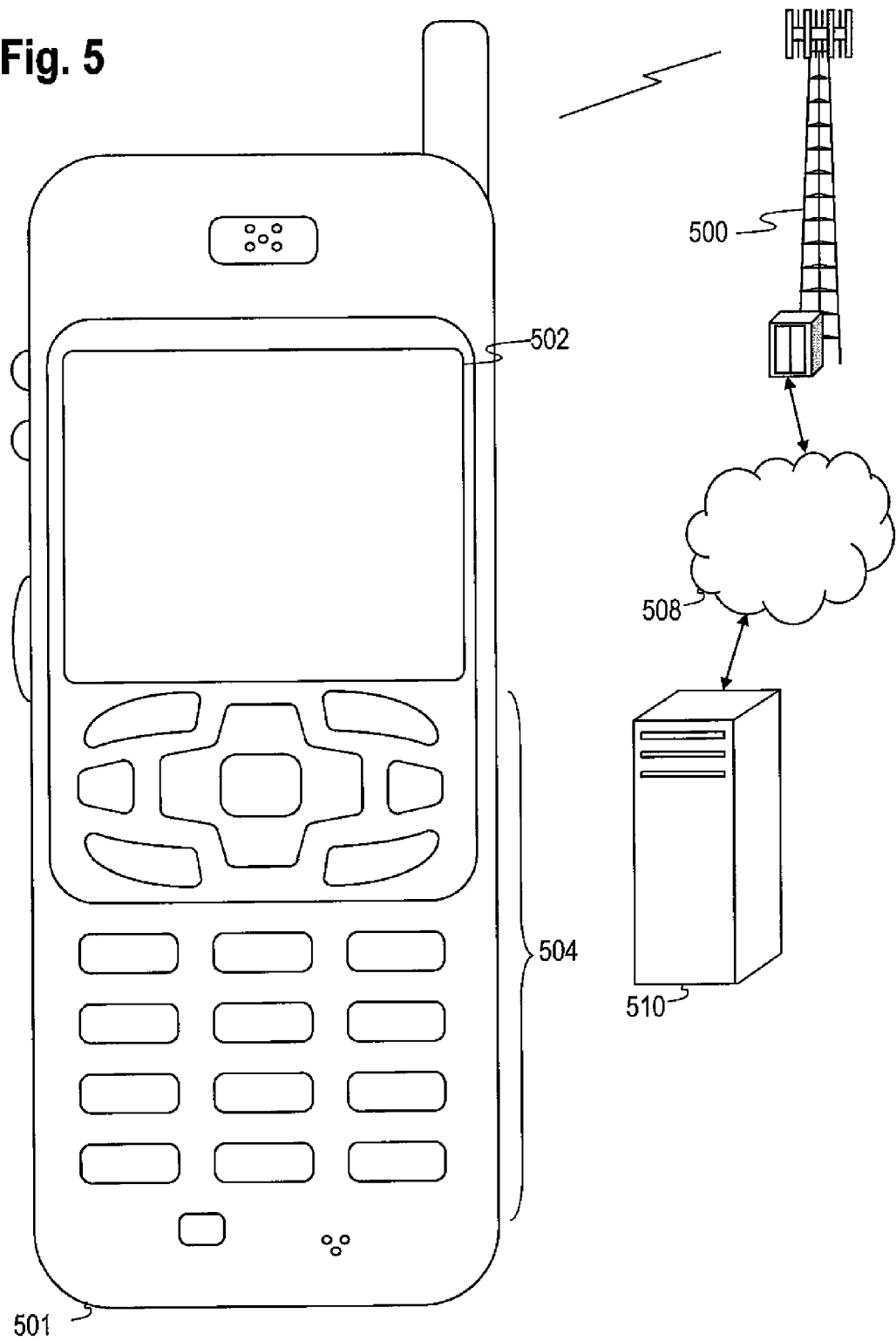
FIG. 5 is a diagram of a wireless communications system including a user agent operable for some of the various embodiments of the disclosure.

FIG. 5 illustrates a wireless communications system including an embodiment of a UA 501. The UA 501 is operable for implementing aspects of the disclosure, but the disclosure should not be limited to these implementations. Though illustrated as a mobile phone, the UA 501 may take various forms including a wireless handset, a pager, a personal digital assistant (PDA), a portable computer, a tablet computer, or a laptop computer. Many suitable devices combine some or all of these functions. In some embodiments of the disclosure, the UA 501 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 501 may be a portable, laptop or other computing device. The UA 501 may support specialized activities such as gaming, inventory control, job control, and/or task management functions, and so on.

The UA 501 includes a display 502. The UA 501 also includes a touch-sensitive surface, a keyboard or other input keys generally referred as 504 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 501 may present options for the user to select, controls for the user to actuate, and/or cursors or other indicators for the user to direct.

The UA 501 may further accept data entry from the user, including numbers to dial or various parameter values for configuring the operation of the UA 501. The UA 501 may further execute one or more software or firmware applications in response to user commands. These applications may configure the UA 501 to perform various customized functions in response to user interaction. Additionally, the UA 501 may be programmed and/or configured over-the-air, for example from a wireless base station, a wireless access point, or a peer UA 501.

Among the various applications executable by the UA 501 are a web browser, which enables the display 502 to show a web page. The web page may be obtained via wireless communications with a wireless network access node, a cell tower, a peer UA 501 or any other wireless communication network or system 500. The network 500 is coupled to a wired network 508, such as the Internet. Via the wireless link and the wired network, the UA 501 has access to information on various servers, such as a server 510. The server 510 may provide content that may be shown on the display 502. Alternately, the UA 501 may access the network 500 through a peer UA 501 acting as an intermediary, in a relay type or hop type of connection.

Figure 6:
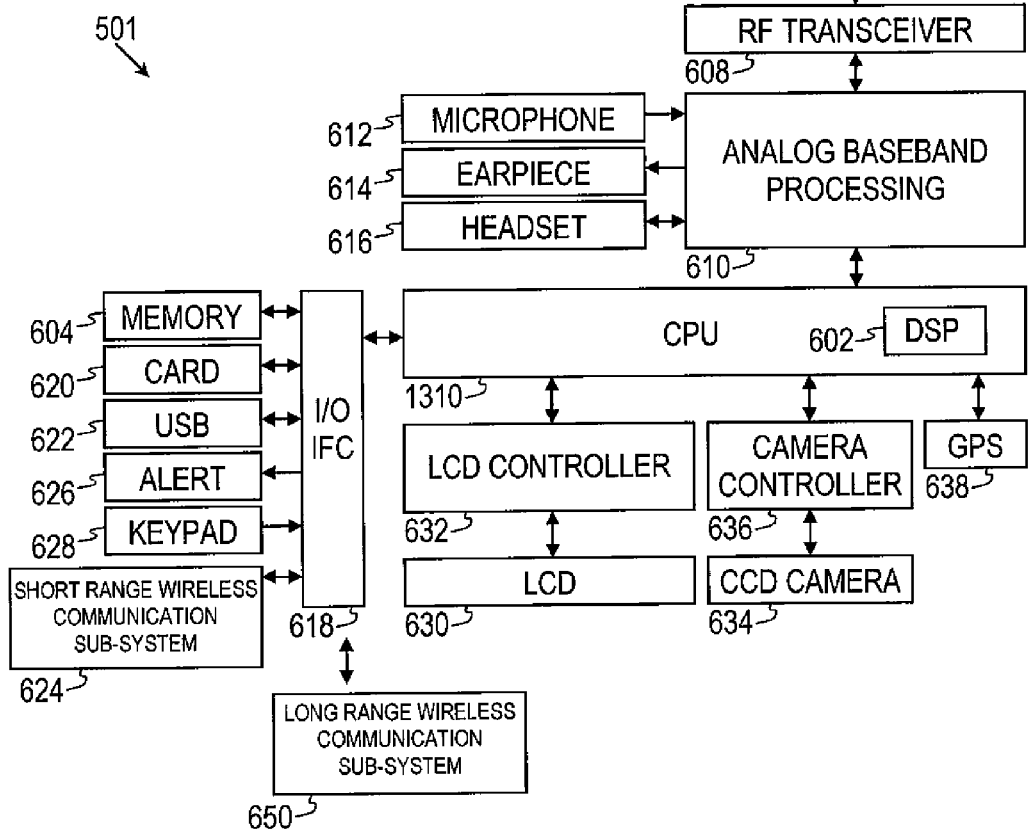
FIG. 6 is a block diagram of a user agent operable for some of the various embodiments of the disclosure.

FIG. 6 shows a block diagram of the UA 501. While a variety of known components of the UA 501 are depicted, in an embodiment a subset of the listed components and/or additional components not listed may be included in the UA 501. The UA 501 includes a memory 604 and a central processing unit (CPU) 1310 that may incorporate a digital signal processor (DSP) 602. As shown, the UA 501 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, a short range wireless communication sub-system 624, an alert 626, a keypad 628, a liquid crystal display (LCD), which may include a touch sensitive surface 630, an LCD controller 632, a charge-coupled device (CCD) camera 634, a camera controller 636, and a global positioning system (GPS) sensor 638. In an embodiment, the UA 501 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the UA 501 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the UA 501 to send and receive information from a cellular network or some other available wireless communications network or from a peer UA 501. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 and/or the DSP 602 or other central processing unit. In some embodiments, the RF Transceiver 608, portions of the Antenna and Front End 606, and the analog baseband processing unit 610 may be combined in one or more processing units and/or application specific integrated circuits (ASICs).

The analog baseband processing unit 610 may provide various analog processing of inputs and outputs, for example analog processing of inputs from the microphone 612 and the headset 616 and outputs to the earpiece 614 and the headset 616. To that end, the analog baseband processing unit 610 may have ports for connecting to the built-in microphone 612 and the earpiece speaker 614 that enable the UA 501 to be used as a cell phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast Fourier transforming, and cyclic prefix appending, and for a receiver function the DSP 602 may perform cyclic prefix removal, fast Fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB interface 622 and the short range wireless communication sub-system 624. The USB interface 622 may be used to charge the UA 501 and may also enable the UA 501 to function as a peripheral device to exchange information with a personal computer or other computer system. The short range wireless communication sub-system 624 may include an infrared port, a Bluetooth interface, an IEEE 802.11 compliant wireless interface, or any other short range wireless communication sub-system, which may enable the UA 501 to communicate wirelessly with other nearby mobile devices and/or wireless base stations. A long range wireless communication sub-system 650 may also be present and may be compliant with IEEE 802.16.

The input/output interface 618 may further connect the DSP 602 to the alert 626 that, when triggered, causes the UA 501 to provide a notice to the user, for example, by ringing, playing a melody, or vibrating. The alert 626 may serve as a mechanism for alerting the user to any of various events such as an incoming call, a new text message, and an appointment reminder by silently vibrating, or by playing a specific pre-assigned melody for a particular caller.

The keypad 628 couples to the DSP 602 via the interface 618 to provide one mechanism for the user to make selections, enter information, and otherwise provide input to the UA 501. The keyboard 628 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 630, which may include touch screen capability and also display text and/or graphics to the user. The LCD controller 632 couples the DSP 602 to the LCD 630.

The CCD camera 634, if equipped, enables the UA 501 to take digital pictures. The DSP 602 communicates with the CCD camera 634 via the camera controller 636. In another embodiment, a camera operating according to a technology other than Charge Coupled Device cameras may be employed. The GPS sensor 638 is coupled to the DSP 602 to decode global positioning system signals, thereby enabling the UA 501 to determine its position. Various other peripherals may also be included to provide additional functions, e.g., radio and television reception.

Figure 7:
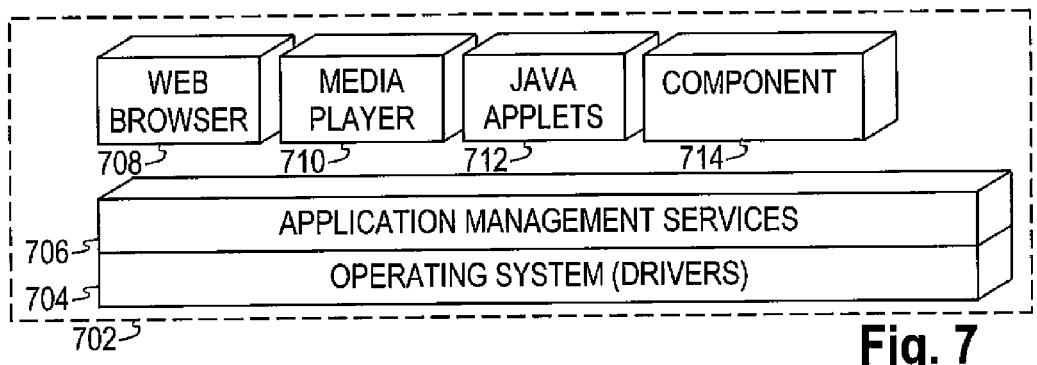
FIG. 7 is a diagram of a software environment that may be implemented on a user agent operable for some of the various embodiments of the disclosure.

FIG. 7 illustrates a software environment 702 that may be implemented by the DSP 602. Alternatively, the software environment 702 can be executed in an execution environment hosted by the CPU 1310 on the UA 501 or by a logical CPU with a combined DSP function. The DSP 602 executes operating system drivers 704 that provide a platform from which the rest of the software operates. The operating system drivers 704 provide drivers for the node hardware with standardized interfaces that are accessible to application software. The operating system drivers 704 include application management services ("AMS") 706 that transfer control between applications running on the UA 501, monitor applications, preempt applications, and perform other functions of an underlying operating system platform such as controlling, monitoring, and sometimes preempting or terminating logical processes, including execution threads.

Also shown in FIG. 7 are a web browser application 708, a media player application 710, and Java applets 712. The web browser application 708 configures the UA 501 to operate as a web browser, allowing a user to enter information into forms and select links to retrieve and view web pages. The media player application 710 configures the UA 501 to retrieve and play audio or audiovisual media. The Java applets 712 configure the UA 501 to provide games, utilities, and other functionality. The AMS 706 may also host a Java Virtual Machine on which the Java applets 712 can execute. Other execution environments could also be hosted, such as a C runtime environment to support executable programs and applications written in the C programming language. A component 714 might provide functionality related to the use of presence parameter profiles.

Figure 8:
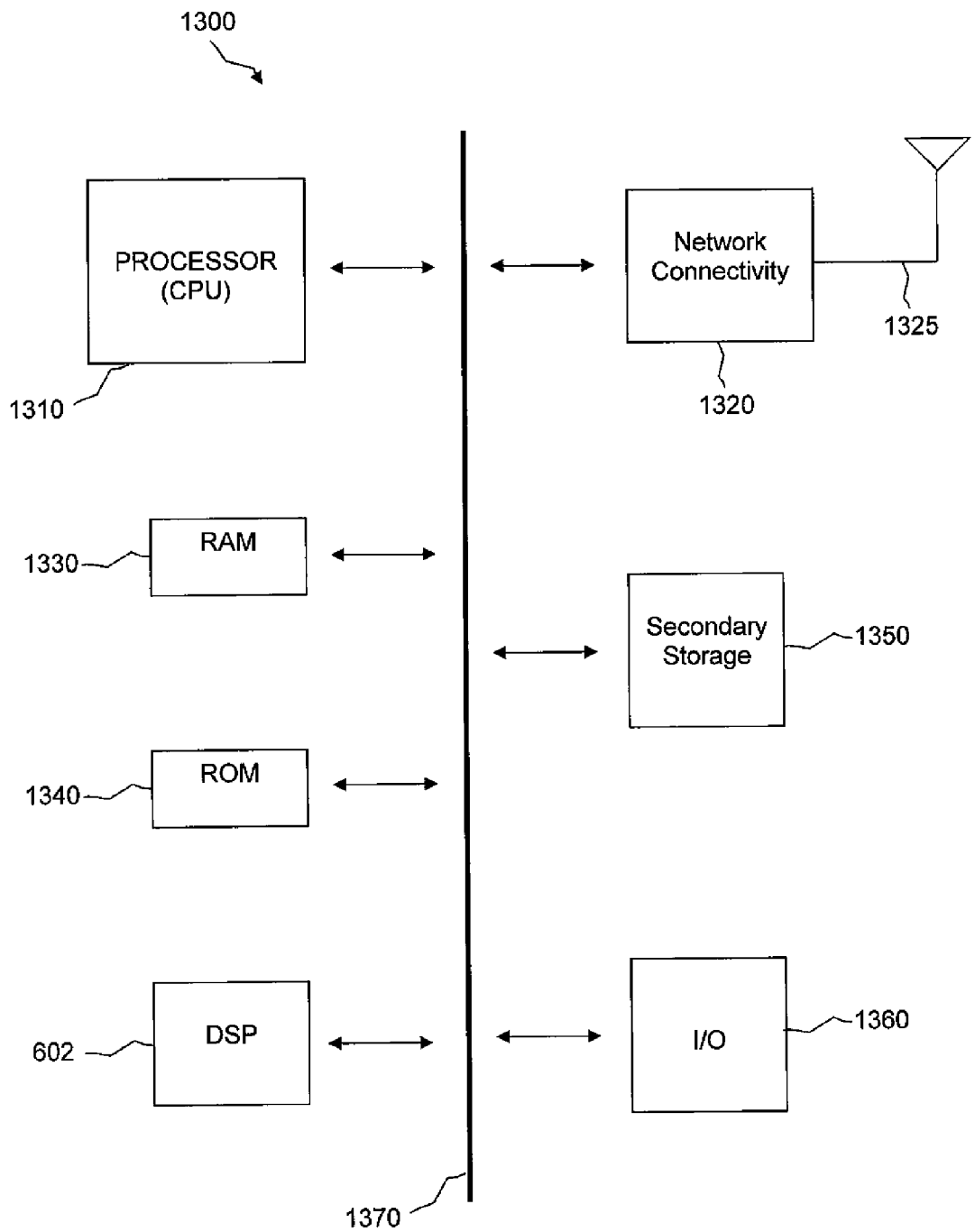
FIG. 8 illustrates a processor and related components suitable for implementing the several embodiments of the present disclosure.

The UA 501 and other components described above might include a processing component that is capable of executing instructions related to the actions described above. FIG. 8 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as the DSP 602 described above. Although the DSP 602 is shown as a separate component, the DSP 602 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 501, such as the display 502 and the input 504.

Additional information related to the presence access layer and other topics discussed herein can be found in the following documents, which are incorporated herein by reference as if reproduced in their entirety: U.S. Provisional Patent Application No. 61/013,813, filed Dec. 14, 2007, by Brian McColgan, et al, entitled "Method and System for a Context Aware Mechanism for Use in Presence and Location"; U.S. Provisional Patent Application No. 61/013,827, filed Dec. 14, 2007, by Brian McColgan, et al, entitled "Method and System for a Context Aware Mechanism in an Integrated or Distributed Configuration"; and U.S. Provisional Patent Application No. 61/013,834, filed Dec. 14, 2007, by Brian McColgan, et al, entitled "Method and System for Specifying, Applying and Executing Application Related Aspects through Policies, Rules and/or Triggers".

In an embodiment, a method for providing presence-related information is provided. The method includes creating a template of presence parameters for an application, storing the template, a presence access layer retrieving the template, the presence access layer using the template to create a profile containing at least one presence parameter for the application, and the presence access layer using the profile to specify a presence-related action for the application.

In an alternative embodiment, a system is provided. The system includes a presence access layer configurator configured to promote the creation of a template of presence parameters for an application and the storing of the template. The system also includes a presence access layer configured to retrieve the template, use the template to create an instance of a profile containing at least one presence parameter for the application, and use the profile to specify a presence-related action for the application.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:

receiving, at a presence access layer (PAL) server, a service request from a watcher or PAL client, the service request including a service identifier;

retrieving a profile template to establish presence-related parameters for a service associated with the service identifier; and using the presence-related parameters at the PAL server for rendering functionality, on behalf of an application or the service, to the watcher or PAL client.

2. The method of claim 1, wherein rendering functionality comprises one of:

providing a presence aspect to the watcher or the PAL client; or evaluating a presence aspect for a service on behalf of the watcher or the PAL client.

3. The method of claim 1, wherein the presence-related parameters comprise at least one of:

a presence aspect;

a trigger;

a rule; or a policy.

4. The method of claim 3, wherein the presence aspect comprises at least one of:

a willingness to communicate;

a reachability;

an availability;

an interest; or a location parameter.

5. The method of claim 1, wherein retrieving the profile template is performed via a presence access layer configurator which is configured to limit access to the template.

6. The method of claim 1, wherein the application is at least one of:

a push-to-talk over cellular (PoC) service; or an instant messenger (IM) service.

7. The method of claim 1, wherein the profile template applies to at least one of:
- an individual application;
- a group of applications;
- an individual user of an application; or
- a group of users of an application.

8. A network component comprising:
- a processor executing a Presence Access Layer (PAL), the PAL being configured to:
  - receive a service request from a watcher or PAL client, the service request including a service identifier;
  - retrieve a profile template to establish presence-related parameters for a service associated with the service identifier; and
  - use the presence-related parameters for rendering functionality, on behalf of an application or the service, to the watcher or PAL client.

9. The network component of claim 8, wherein rendering functionality comprises one of:
- providing a presence aspect to the watcher or the PAL client; or
- evaluating a presence aspect for a service on behalf of the watcher or the PAL client.

10. The network component of claim 8, wherein the presence-related parameters comprise at least one of:
- a presence aspect;
- a trigger;
- a rule; or
- a policy.

11. The network component of claim 10, wherein the presence aspect comprises at least one of:
- a willingness to communicate;
- a reachability;
- an availability;
- an interest; or
- a location parameter.

12. The network component of claim 8, wherein the operation to retrieve the profile template is performed via a presence access layer configurator which is configured to limit access to the template.

13. The network component of claim 8, wherein the application is at least one of:
- a push-to-talk over cellular (PoC) service; or
- an instant messenger (IM) service.

14. The network component of claim 8, wherein the profile template applies to at least one of:
- an individual application;
- a group of applications;
- an individual user of an application; or
- a group of users of an application.

15. A user equipment comprising:
- a processor executing a Presence Access Layer (PAL) client, the PAL client being configured to:
  - transmit a service request from the PAL client, the service request including a service identifier; and
  - receive a response based on a profile template configured to establish presence-related parameters for a service associated with the service identifier.

16. The user equipment of claim 15, wherein the response comprises one of:
- a presence aspect; or
- an evaluation of a presence aspect for a service on behalf of the PAL client.

17. The user equipment of claim 15, wherein the presence-related parameters comprise at least one of:
- a presence aspect;
- a trigger;
- a rule; or
- a policy.

18. The user equipment of claim 17, wherein the presence aspect comprises at least one of:
- a willingness to communicate;
- a reachability;
- an availability;
- an interest; or
- a location parameter.

19. The user equipment of claim 15, wherein the application is at least one of:
- a push-to-talk over cellular (PoC) service; or
- an instant messenger (IM) service.

20. The user equipment of claim 15, wherein the profile template applies to at least one of:
- an individual application;
- a group of applications;
- an individual user of an application; or
- a group of users of an application.

* * * * *